Nov. 11, 1924.

C. S. HALL

AIRCRAFT

Filed May 16, 1922   2 Sheets-Sheet 1

1,515,037

Charles S. Hall.
INVENTOR.

BY *Daniel N Clark*
ATTORNEY.

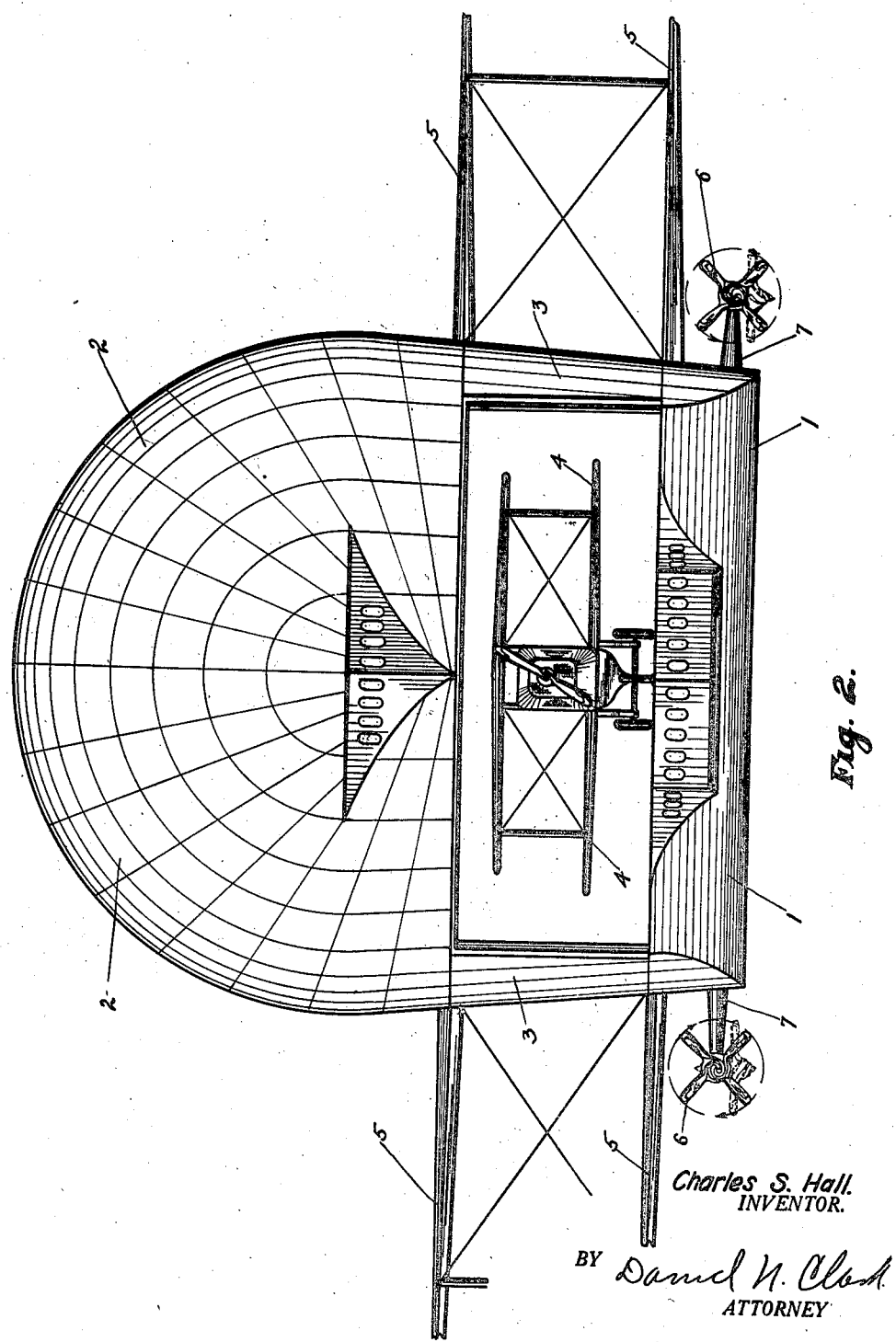

Patented Nov. 11, 1924.

1,515,037

UNITED STATES PATENT OFFICE.

CHARLES S. HALL, OF LOS ANGELES, CALIFORNIA.

AIRCRAFT.

Application filed May 16, 1922. Serial No. 561,378.

REISSUED

*To all whom it may concern:*

Be it known that I, CHARLES S. HALL, a citizen of the United States of America, a resident of Los Angeles, in the county of Los Angeles, State of California, have invented a new and useful Improvement in Aircraft, of which the following, when read with reference to the accompanying drawings, is such a full, clear, and exact specification embodying the invention in its preferred form as will enable others skilled in the art to which it appertains to make and use the same.

One of the objects of my invention is to utilize the combination of the lighter-than-air and heavier-than-air type of aircraft whereby a smaller type of aircraft may be housed within the larger craft and this larger craft used as a basis of operations for the smaller craft.

Another object of my invention is to provide a means whereby the smaller craft may land upon, and be stored within, as well as to be able to take the air from, the larger craft.

Another object of my invention is to provide a "mother" craft which will be able to carry and house the smaller craft, in both a take-off and a landing of such larger craft whereby a relatively small field may be used since the "mother" craft may make a landing with little or no ground speed.

Another object of my invention is to provide an aircraft which is especially desirable during times of war being capable of long and sustained flight and during all of such time house smaller and auxiliary craft for scout duty.

Another object is to provide such a combination and association of elements in an aircraft, in conjunction with a relatively flat under surface, as will give the craft greater carrying capacity than otherwise such as may be required for commercial, and military and naval uses.

Having thus briefly outlined the objects of my invention, though, of course, it will be understood that the said objects, as stated above, are not the only objects to be accomplished, since other objects will be apparent from a reading of the complete specification and the drawings, which form an essential part hereof, I will now further describe the same.

Figure 2 is a front-elevational view showing the smaller aircraft housed within the "mother" craft.

Figure 1:
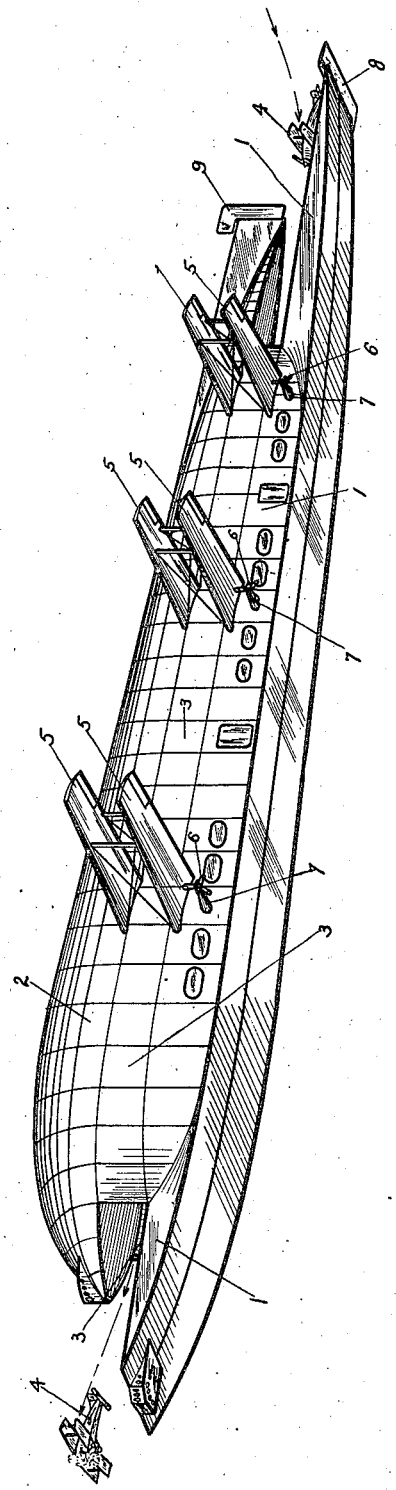
Figure 1 is a perspective view of the aircraft showing its relative arrangements.

In carrying out my invention, a suitable body 1 is provided, as shown in both figures. This body is depended from a gas containing envelope 2, as shown in both figures. Between body 1 and envelope 2, as shown, side walls 3 are arranged. These walls may be constructed so as to be filled with a suitable lighter-than-air element, such as may be used within the envelope 2. The upper part of said body 1 forms a floor of a runway upon which the smaller aircraft 4 may alight, rest, and take-off, while the lower part of the envelope 2 forms a ceiling of the housing runway, as may be observed by the front elevational view, shown in Figure 2.

On both sides of the aircraft, suitable planes, or wings 5 are arranged. Suitable propellers 6 are arranged operatively on extending pivoting cases 7, as shown in both figures. These cases 7 are so operatively arranged within the body 1 by suitable means, not herein more specifically enumerated, whereby they may be swung upon the pivots so that the propeller arranged to rotate upon an axis at right angles to the longitudinal axis of the said pivoting cases 7, whereby the propellers may be swung by means of the said casing 7, so as to exert a thrust in any given direction on a perpendicular plane parallel to the longitudinal dimension of the said craft, as shown. Suitable controls, such as rudders and elevators 8 and 9 may be constructed upon either the envelope 2 or the body 1.

Now, in operation, it will be seen that when the envelope 2 is filled with a suitable lighter-than-air element, such as hydrogen, or helium, the buoyancy created thereby will tend to, if not actually lift the whole of the aircraft from the ground. If, however, additional lifting force is necessary, this may be accomplished by swinging the pivoting casing 7 in such a way that the propeller rotatably arranged thereon will exert a thrust in an upward direction. Thus, it will be seen, and when the aircraft is in the air, the smaller aircraft 4 will be in a position to make a take-off at any time from the floor of the cavity arranged within the ceiling formed by the lower surface of envelope 2, and the side walls 3 and the top of body 1, as hereinbefore described, and that, by reason of the runway thus afforded, the take-off of the smaller craft may be facilitated. The landing of the smaller aircraft 4 on the runway of the "mother" ship will be seen in the position at the stern thereof, as shown in Figure 1.

It will thus be seen that with the features thus combined a craft is developed which will enable it to carry heavy loads, such as is one of the objects of the present invention.

Of course, it will be understood that various changes can be made in the relative size and shape of both the envelope and of the body, without departing from the spirit of this invention, nor is it to be understood that I limit myself to the particular design, since the said drawings are used for the purpose of illustrating my invention, and since other and different types of construction may be had, either by placing the runway between two or more envelopes arranged on the same horizontal parallels or in any other suitable way, as my invention relates to a means whereby a smaller aircraft may be landed upon, housed in, and may take the air from, a "mother" aircraft.

Having thus described my invention in its preferred form what I claim, and for which I desire to secure Letters Patent, are as follows:

1. In an aircraft the combination of; a gas container; wings attached to the said container; a platform, suitable to the landing and taking off of smaller aircraft, arranged longitudinally through the said container; a relatively flat body arranged under the said container; revolvable propeller frames extending from the said craft; propellers operatively mounted upon said frames; and controls mounted upon the said craft, substantially as described.

2. In an aircraft the combination of; a gas containing envelope; a relatively flat body attached thereto; a runway arranged longitudinally through the said craft, the said runway suitably arranged for the landings and takings off of smaller aircraft; a housing space for smaller aircraft arranged within the said body; wings attached to the said envelope and the said body; revolving propeller frames extending from the said body; propellers mounted upon said frames; and controls mounted upon the said body, substantially as disclosed.

3. In an aircraft of the combination; a gas container; wings attached thereto; revolving propeller casing arranged thereon; propellers operatively mounted upon the said casing; a runway arranged within the said aircraft suitable for the landings and takings off of smaller aircraft; a body of relatively flat undersurface; and suitable controls mounted upon the said craft, substantially as disclosed.

4. In an aircraft the combination; a gas container; a body arranged to the said container, the said body having a relatively flat undersurface; a platform arranged between the said gas container and the said body, the said platform suited for the landings thereon and takings off thereof of smaller aircraft; propeller casings arranged upon the said body, the said propeller casings rotatably journaled in the said body; propellers operatively mounted in the said casings; and controls arranged on the said body, substantially as shown.

In testimony whereof I have signed my name to this specification.

CHARLES S. HALL.